United States Patent [19]
Vandeplas et al.

[11] Patent Number: 4,566,430
[45] Date of Patent: Jan. 28, 1986

[54] SUN HEATING EQUIPMENT

[75] Inventors: Paul Vandeplas, Mol; Lucien Kinnaer, Herentals, both of Belgium

[73] Assignee: Studiecentrum voor Kernenergie, "S.C.K.", Brussels, Belgium

[21] Appl. No.: 476,127

[22] Filed: Mar. 17, 1983

[30] Foreign Application Priority Data

Mar. 17, 1982 [BE] Belgium .................... 2/59632

[51] Int. Cl.⁴ ............................................. F24J 3/02
[52] U.S. Cl. .................... 126/433; 126/435; 126/444; 165/104.25
[58] Field of Search ............... 126/432, 433, 435, 444, 126/445, 437, 417; 165/168, 170, 104.25; 202/205; 203/DIG. 1

[56] References Cited

U.S. PATENT DOCUMENTS

| | | | |
|---|---|---|---|
| 3,369,539 | 2/1968 | Thomason | 126/432 |
| 3,961,619 | 6/1976 | Estes et al. | 126/444 |
| 4,121,568 | 10/1978 | Olsen | 126/432 |
| 4,124,020 | 11/1978 | Noble | 126/901 X |
| 4,134,390 | 1/1979 | Rawal | 126/444 |
| 4,299,200 | 11/1981 | Spencer | 126/445 X |
| 4,372,291 | 2/1983 | Schwartz | 126/443 |

FOREIGN PATENT DOCUMENTS

| | | | |
|---|---|---|---|
| 2601673 | 7/1977 | Fed. Rep. of Germany | 126/433 |
| 0023739 | 2/1977 | Japan | 126/433 |
| 7802076 | 4/1978 | Netherlands . | |

Primary Examiner—Margaret A. Focarino
Attorney, Agent, or Firm—Stevens, Davis, Miller & Mosher

[57] ABSTRACT

The outlet of the collectors is connected to the inlet thereof by means of a line in which are mounted the primary part of a heat exchanger condenser, a vacuum pump, a venting cylinder, and a flow-control device. A distributing device feeds water with a pressure drop and a small flow rate from the line into each collector. The flow rate is such that water in liquid form does not fill completely the collectors and vaporizes at least for the most part before leaving the collectors. The heat exchanger comprises a secondary part which is part of a hot water line which runs in closed circuit and wherein are mounted a circulating pump and a storage tank.

4 Claims, 7 Drawing Figures

Fig. 3

SUN HEATING EQUIPMENT

BACKGROUND OF THE INVENTION

This invention relates to a sun heating equipment which comprises at least one sun collector, which sun collector comprises at least one upwards-facing hollow tightly closed absorbing plate which is provided with an inlet and an outlet and which has at least one flow channel which connects said inlet to said outlet, which equipment further comprises a line for heat-transfer fluid which connects the absorbing plate outlet to the inlet thereof, means to remove heat from the fluid inside said line and means for generating a vacuum inside said absorbing plate.

Such a sun heating equipment is known from U.S. Pat. No. 4,134,390.

The sun heating equipment according to said U.S. Patent comprises a number of hollow absorbing plates which are formed by two metal panels secured against one another which are provided with such depressions as to form between said panels flow channels for the heat-transfer fluid, which channels connect the inlet at the bottom of said absorbing plate to the outlet at the top thereof. A circulating pump in that line which connects the outlets of said absorbing plates to the inlets thereof, pumps said fluid in liquid form to the absorbing plates where said fluid vaporizes. Said fluid then leaves in vapour form the absorbing plates and condenses inside a condenser heat exchanger which is mounted upstream of said circulating pump in the line.

A storage tank is mounted in parallel relationship with said condenser/heat exchanger. The vaporizing of the fluid inside said absorbing plates is enhanced due to a vacuum prevailing inside the absorbing plates. Said vacuum is generated by a vacuum pump which is mounted at the end of a branch line, which branch line connects between two valves to the parallel line wherein said storage tank is mounted. During the normal operation of the equipment, said vacuum pump does not work, but the pressure inside the absorbing plates is low enough to cause all of that liquid fed inside the absorbing plates to be vaporized at a a selected temperature. The equipment comprises a control device which controls notably said valves and vacuum pump. Said control device insures that said vacuum pump starts operating and can restore the vacuum inside the absorbing plates when the pressure inside said absorbing plates has become too high. The control device also controls the operation start of the vacuum pump when the temperature of the absorbing plates lies below said selected temperature. The valves are thereby so operated as to have said vacuum pump suck out the absorbing plates and the liquid from said plates collect in the storage tank. There is thereby no danger that the fluid in liquid form which completely fills the bottom of the absorbing plates, freezes as at low temperature, the absorbing plates are emptied. Such equipment does however include a quite intricate control device and the working thereof is quite irregular as the feeding of heat-transfer fluid to the collectors is stopped whenever the temperature of the absorbing plates is too low or the pressure inside said plates is too high. The start of the vacuum pump working when the equipment operates results in the moisture inside said pump condensing and being removed from the circuit. After some time, the equipment will become completely dry and will stop working. Moreover, the vaporizing of the water inside the absorbing plate will occur through the boil phenomenon as the absorbing plate is necessarily filled with water, whereby an irregular working with water conveying occurs and no normal working of the condenser is possible. Due to the relatively large liquid mass inside the absorbing plate, the heat inertia of the equipment is quite strong.

The invention has for object to obviate said drawbacks and to provide a sun heating equipment which has a quite simple structure and does not require any intricate control device, whereby the collectors have a small heat inertia, do not have to be emptied to avoid damages due to freezing, and allow a very good heat transfer between said collectors and the heat-transfer fluid.

THE INVENTION

For this purpose, the absorbing plate has in the location of the flow channel at least one moistenable inner wall and it is provided at the top with the inlet and at the bottom with the outlet, while the equipment comprises means to limit the supply rate of the fluid in liquid form to the absorbing plate in such a way that moistenable inner wall in the location of the flow channel is regularly irrigated at the top at least with a thin film of liquid fluid, which fluid does not fill completely at any height whatsoever the flow channel and vaporizes at least mostly before reaching the bottom of said absorbing plate.

FURTHER BACKGROUND OF THE INVENTION

Sun heating equipments with an upwardly-directed absorbing plate and means to feed heat-transfer fluid in liquid form to the top of said absorbing plate with a limited flow rate are known per se, but in these known sun heating equipments, the absorbing plate is not a hollow plate and hence the liquid is not fed into the plate and no vacuum either is generated inside said plate. The vaporizing of the fluid is not enhanced either with a vacuum on the absorbing plate outer side.

Thus U.S. Pat. No. 4,124,020 describes a sun heating equipment of which the sun collector comprises a single-walled absorbing plate arranged at an angle. By means of a circulating pump, heat-transfer fluid in liquid form is continuously added to the top of the absorbing plate where said fluid is spread by a distributing device in various thin layers over the lower side of said absorbing plate. The fluid heated by the absorbing plate is collected again at the bottom and sucked through a heat exchanger by the circulating pump. On the absorbing plate lower side prevails no vacuum and there occurs substantially no vaporizing of the heat-transfer fluid. There is thus no heat removing from the absorbing plate through vaporizing, in such a way that the heat transfer inside the collectors is quite limited.

Dutch Patent Application No. 78-02076 describes a sun heating equipment which has an upwardly-directed single-walled absorbing plate which faces the sun with the one side thereof and which is covered on the other side with a wick. In one embodiment the heat-transfer fluid in liquid form is fed to the top of said wick. Said fluid is distributed over the wick by capillary conveying helped by gravity. Part of the liquid in the wick vaporizes and the vapour flows through a channel to a condensing chamber where it does condense and convey heat to a heat-storage member. The condensate and the excess liquid from the wick are collected at the bottom in a tank. Vapour bubbles formed at the sun collector bottom then convey part of said liquid upwards to feed the wick again with fluid in liquid form. The fluid flow over the absorbing plate is quite slow and the heat transfer is also low. Due to the wick, a large portion of the fluid is not directly contacting the absorbing plate. The structure and maintenance of such an equipment are moreover intricate.

U.S. Pat. No. 4,159,711 describes an equipment the sun collector of which has a hemispherical absorbing plate and on the sun side with a slight spacing therefrom, a hemispherical translucid plate. Heat-transfer fluid is fed under pressure in liquid form to the top edge of said hemispherical absorbing plate. Said liquid flows over said absorbing plate down to the lowermost point thereof, from which it is discharged to a storage tank. At time intervals liquid is pumped by a pump from the storage tank to a pressure vessel. In the collector the liquid flows over ther upper side of said absorbing plate, whereby it is heated but slightly or not vaporized.

THE INVENTION

In a particular embodiment of the invention, the absorbing plate comprises a plurality of flow channels extending from top to bottom for the heat-transfer fluid, while the means to limit the feed flow rate of the fluid in liquid form to the absorbing plate comprise a distributing device which feeds the fluid with a limited flow rate to each of said flow channels.

In a particular embodiment of the invention, the means to limit the feed flow rate of the fluid in liquid form to the absorbing plate comprise a flow rate adjusting device which is mounted upstream of the absorbing plate and allows a constant flow rate which is substantially equal to the flow rate which can be vaporized in the absorbing plate with a maximum sun radiation on said absorbing plate.

In another particular embodiment of the invention, the means for limiting the feed flow rate of fluid in liquid form to the absorbing plate comprise a flow rate adjusting device which is mounted upstream of the absorbing plate and which allows a flow rate which is substantially equal at every moment to that flow rate which can be vaporized in the absorbing plate, for that sun radiation present on that moment, which falls on said absorbing plate.

In a useful embodiment of the invention, the means for generating a vacuum inside the absorbing plate comprise a vacuum pump which is directly mounted in the line and which is of a type which can pump both gaseous and liquid fluid.

Other details and advantages of the invention will stand out from the following description of five embodiments of a sun heating equipment according to the invention; this description is only given by way of example and does not limit the invention; the reference numerals pertain to the accompanying drawings.

DRAWINGS

In the various figures, the same reference numerals pertain to similar elements.

DESCRIPTION OF A PREFERRED EMBODIMENT

Figure 1:
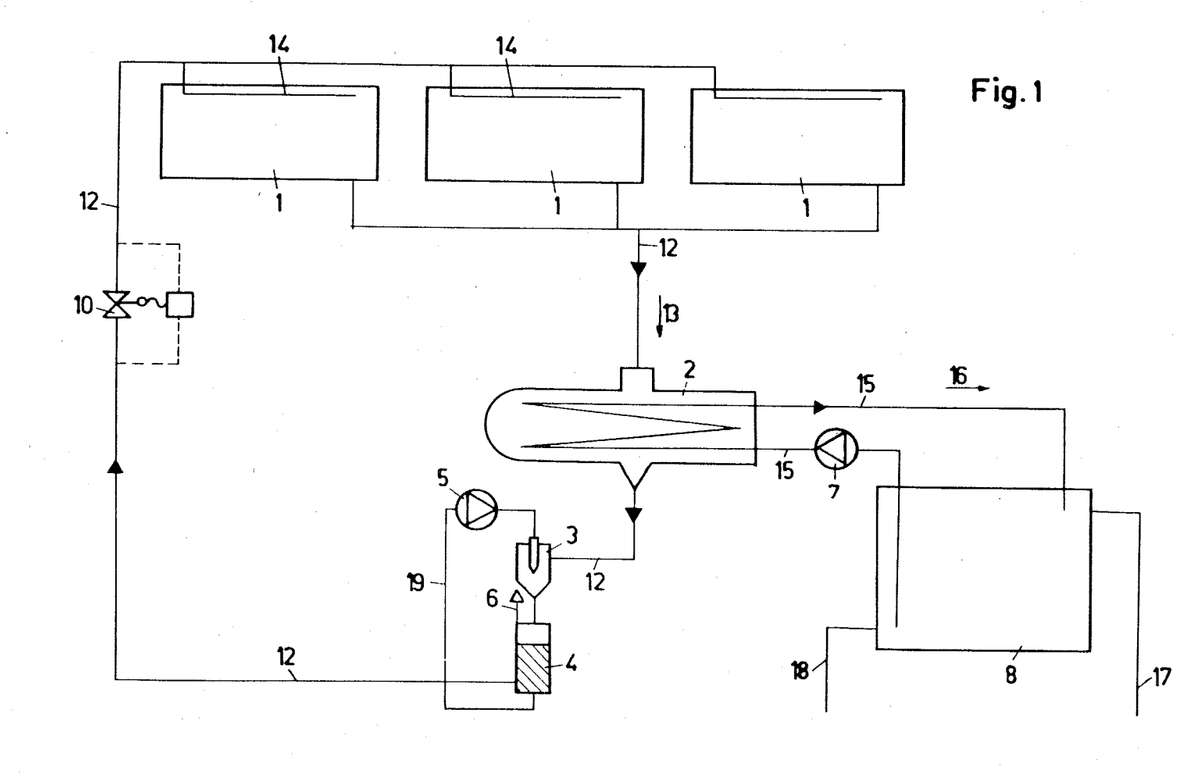
FIG. 1 is a diagrammatic showing of a sun heating equipment according to the invention.

The sun heating equipment as shown in FIG. 1, as other known equipments, comprises a number of sun collectors 1, a line 12 which connects the outlet from said sun collectors 1 to the inlet thereof, and means to remove heat from said line 12.

In FIG. 1 have been shown but three collectors 1, but it is clear that the equipment may have any number of collectors 1. In that case where the equipment comprises more than one collector 1, said collectors are connected in parallel to said line 12, whereby thus all of the inlets thereof communicate with all of the outlets thereof. The flow direction of the water through line 12 is shown with an arrow 13 in FIG. 1.

Upstream of said collectors 1 is mounted a vacuum pump 3 and inside collectors 1 is mounted a distributing device 14 which feeds the water with a pressure drop and a small flow rate to the inner side of said collectors 1. There appears thereby an underpressure inside collectors 1. Consequently that water which is fed to the collectors 1 can be vaporized at a lower temperature and is mainly present as vapour inside said collectors. The vacuum pump 3 is a pump type which can pump both gaseous and liquid fluid.

The means for removing heat from line 12 are formed by a heat exchanger 2 designed as a condenser. The primary part thereof is mounted upstream of vacuum pump 3, between said pump and collectors 1. The secondary part thereof is part of a hot water line 15 which runs in closed circuit and wherein are mounted a circulating pump 7 and upstream thereof, between said pump 7 and heat exchanger 2, a storage tank 8 for hot water. The water flow direction in hot water line 15 is shown with an arrow 16. Those portions of line 15 lying upstream and downstream of storage tank 8 connect respectively at the top and bottom to storage tank 8. A discharge line 17 and a supply line 18 also connect respectively at the top and bottom, to the water storage tank 8. Inside the primary part of heat exchanger 2, the water vapour which has been formed inside collectors 1, is condensed. As heat exchanger 2, use may be made of a steam condenser available in the trade, but said heat exchanger 2 may usefully be formed by a tube which is arranged inside a closed vessel. Said vessel forms the primary part and the tube the secondary part of the heat exchanger.

Upstream of the vacuum pump 3, in line 12 is mounted a venting cylinder 4 which thus communicates with the pressure side of vacuum pump 3. Said venting cylinder is provided with an automatic-working venting valve with a non-return valve 6. Non-condensable gases may be removed from the equipment by means of said venting cylinder.

The vacuum pump 3 is a water-jet pump. The vacuum chamber of said water-jet pump is connected to the upstream portion of line 12, while the jet pipe thereof is connected to a return line 19 which is connected to venting cylinder 4. The water-jet pump 3 is driven by means of a pump 5 mounted in said return line 19, which forces water from said venting cylinder 4 through the jet pipe of said water-jet pump 3.

Figure 2:
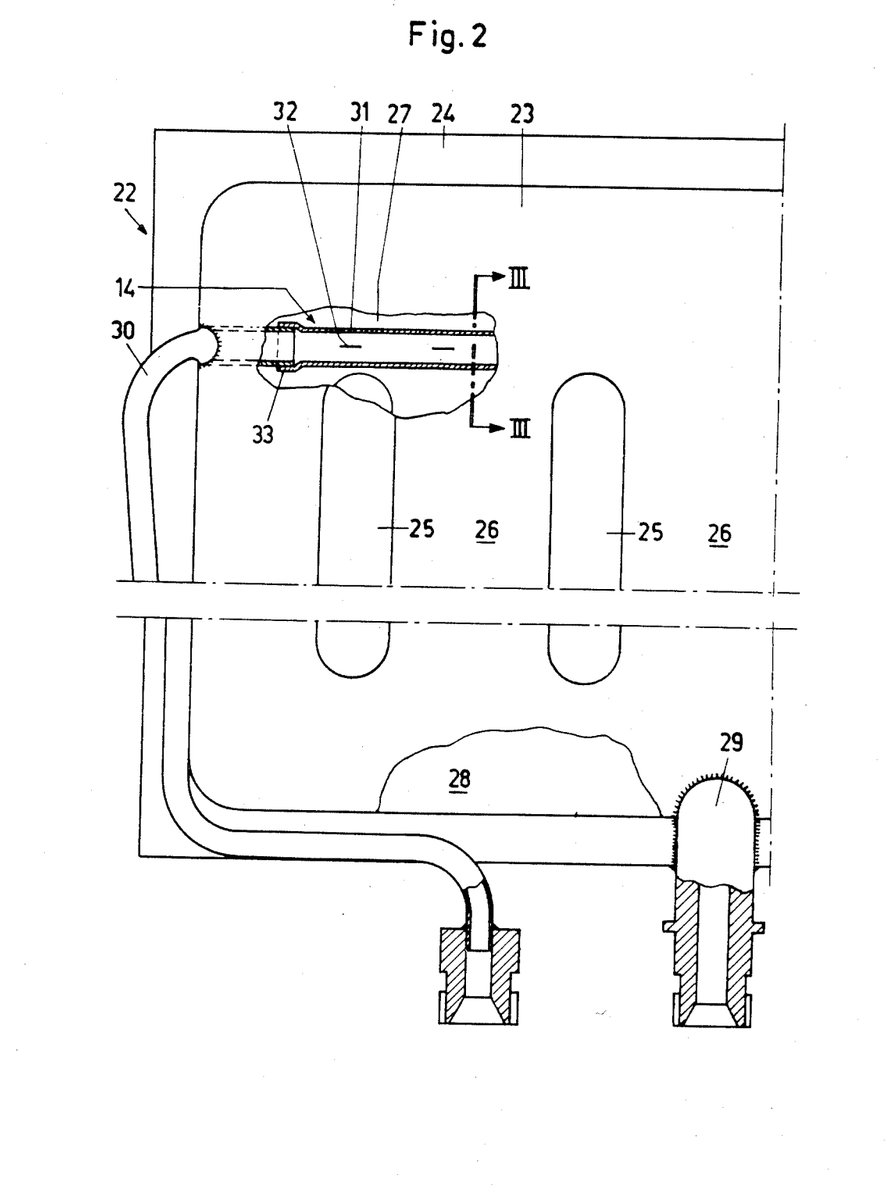
FIG. 2 is a front view with parts cut-away of a portion of an absorbing plate of a sun collector of the equipment according to FIG. 1 but drawn on a larger scale.
Figure 3:
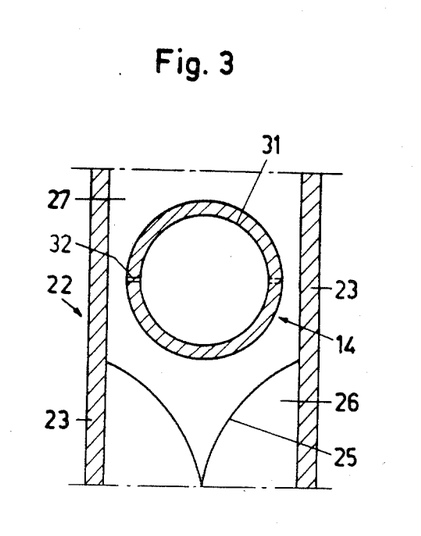
FIG. 3 is a cross-section along line III—III in FIG. 2, but drawn on a still larger scale.

The collectors 1 are to the exception of the distributing device 14, of a type which has been described in detail in Belgian Patent No. 892,527, which is incorporated hereby as reference. They comprise a heat-absorbing wall in the form of an absorbing plate 22 which is mounted inside a housing not shown in the figures, with one or a plurality of translucid walls which let sun energy through, but let as little as possible heat escape. Said absorbing plate 22 is designed as a panel of a panel radiator for central heating and it is thus comprised of two rectangular metal panels 23 which are welded together with the edges 24 thereof, and which are provided with depressions 25 running in the cross-wise direction thereof, in such a way that between both panels 23 are formed channels 26 running in the cross-wise direction, which open on the one hand on a feed space 27 and on the other hand on a discharge space 28. For a normal arrangement, the cross-wise direction lies vertically. To said discharge space 28 connects a discharge part 29 with which said space 28 connects to line 12, while inside said feed space 27 is mounted the distributing device 14, which connects with one end through a feed line 30, to the upstream portion of line 12. In said line 12 are thus cut-in, in sequence along the flow direction: the feed line 30, the distributing device 14, the feed space 27, the channels 26, the discharge space 28, and the discharge part 29.

The panels 23 of said absorbing plate 22 are coated on the outer side with a heat-absorbing material. On the inner side, said panels are easily moistenable and not water-repellent. Said panels 23 are for example steel panels which are slightly rusted on the moistenable inner side.

As it appears from FIGS. 2 and 3, the distributing device 14 is comprised of a thin-walled polytetrafluorethylene (PTFE) hose 31 which extends inside said feed space 27 along the lengthwise direction of absorbing plate 22. Said hose 31 is provided at regular intervals with slits 32.

Said hose 31 is widened at the one end thereof. Said hose is clamped with said widened end 33 on the stainless steel feed line 30. The opposite end of hose 31 is closed by a plug not shown in the figures.

With a nominal overpressure of about 1 bar, the desired flow rate is obtained and a regular moistening of the inner side of absorbing plate 22 may be obtained. With an overpressure of 2 to 3 bar, the slits 32 so open as to obtain a large flow rate and a flushing of said hose 31 occurs, and possible obstructions of said slits 32 after extended operating may be eliminated.

When starting the equipment, the air from absorbing plates 22 and pertaining circuits is sucked by said vacuum pump 3. Due to the automatic venting valve with non-return valve 6, such air may be completely or partly removed from the equipment.

During normal operation, saturated vapour is formed inside collector 1. Such vapour flows to the heat exchanger 2 where it does condense. The condensate is pumped by vacuum pump 3 into the venting cylinder 4, from which the condensate flows back to said collectors 1 under the action of the pressure prevailing therein. Inside said heat exchanger 2, the heat from the condensing heat-transfer water is conveyed to the water which is pumped by pump 7 through the hot water line 15. Such latter water thus heated is stored in storage tank 8. Water may be obtained as desired from said storage tank 8, through discharge line 17. During water discharge, the same amount of water is fed through supply line 18 to storage tank 8, in such a way that the water level therein remains constant.

To feed regularly all of the collectors 1, the pressure drop inside distributing device 14 should be high enough relative to the line losses, in such a way that that portion lying upstream of collectors 1, of line 12 can be subjected to a high enough pressure, but the flow rate in said collectors 1 still remains limited.

The adjusting of the flow rate inside the collectors 1 may be determined by said distributing device 14. The flow rate may however also be adjusted by an additional flow-control device 10 which is mounted upstream of collectors 1 in said line 12. Said flow-control device 10 may either adjust a constant flow rate, or adjust a flow rate which varies according to the sun radiation.

In both cases, said device 10 is comprised of a cock which is cut-in in said line 12 and the opening of which is automatically regulated according to the pressure differential upstream and downstream of said cock, and as the case requires also according to the sun radiation.

The flow rate is adjusted in any case in such a way that the moistenable inner walls of panels 23 of said absorbing plates 22 of collectors 1 are moistened at the top at least without however the channels 26 which are formed between said panels 23 being completely filled with water at any height whatsoever. The water forms but a film over the inner wall, which vaporizes as it flows down.

When a constant flow rate is desired, the flow control device 10 is then so adjusted as to let a constant flow rate flow to the collectors 1, which is equal to or hardly higher than the flow rate which can be vaporized with the maximum received sun radiation in said collectors 1. In this way there is always obtained a complete moistening of the absorbing plates 22, which insures an optimum heat discharge. The flow rate is usually about two liters per hour per m² collector surface area. With a lower sun radiation, an excess water is fed to said absorbing plates 22. Such excess water flows due to gravity, through collectors 1.

When it is desired to obtain a flow rate which is dependent on the sun radiation, the flow control device 10 lets through a water flow rate which corresponds at every moment to that flow rate which can be vaporized inside said collectors 1 with that sun radiation present on that moment. All of the water which flows into said collectors 1 is also vaporized therein.

Due to little or no liquid being present inside the collectors, and such liquid flowing as a thin film over said absorbing plate 22, the heat inertia of said collectors 1 is limited to the heat inertia of said absorbing plates 22 and such inertia is thus very low. There is thus no freezing or overheating problem, and the heat-transfer coefficient is quite high due to the water vaporizing inside said collectors 1.

Figure 4:
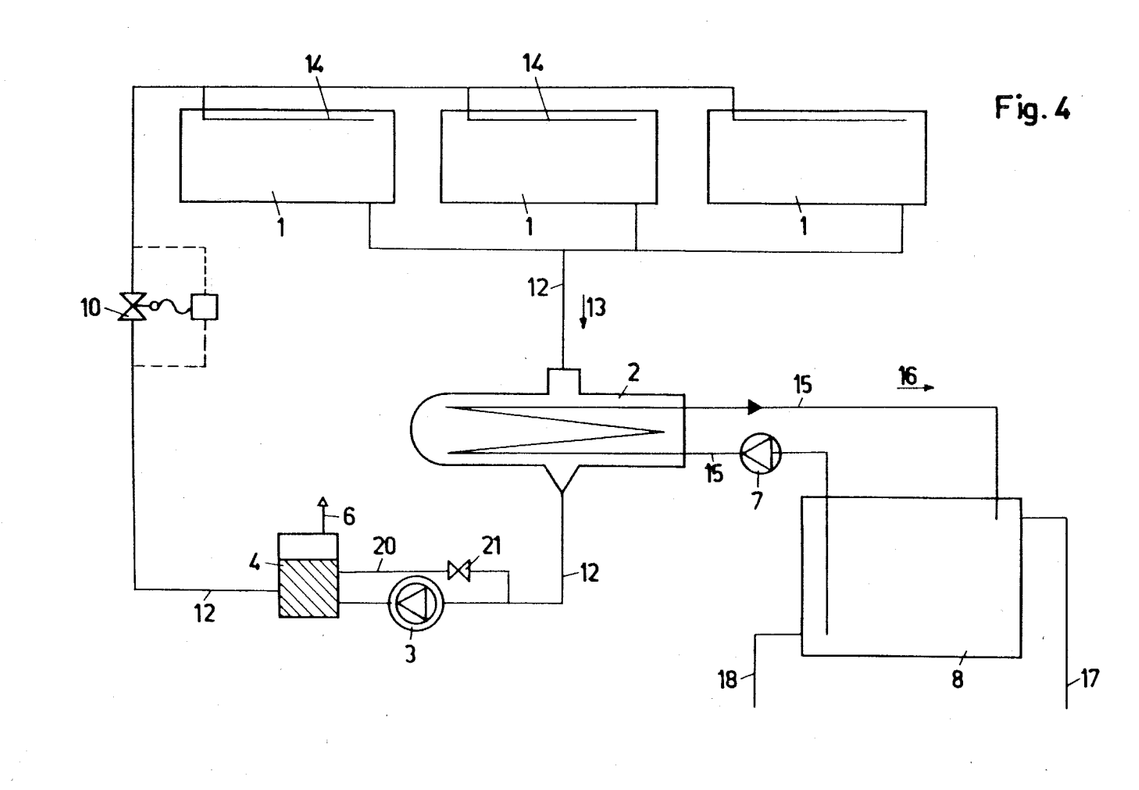
FIG. 4 is a diagrammatic showing similar to FIG. 1 of a sun heating equipment according to the invention, but pertaining to another embodiment of such equipment.

The embodiment of the equipment as shown in FIG. 4 differs from the above-described equipment but in the vacuum pump 3 being no water-jet pump but rather a liquid-ring vacuum pump.

Pumps of liquid-ring type are known as such. They mainly comprise a cylinder-shaped pump housing wherein a radial blade wheel is mounted out of center. The sealing between said blade wheel and the pump housing casing is obtained with liquid, generally water, which is forced against the casing by the centrifugal force as the blade wheel rotates. The space between two blades and inside said liquid ring increases and decreases in sequence at each revolution of the blade wheel, in such a way that a suction and respectively a pressurizing occurs. The pump inlet and outlet are arranged in the pump housing ends, opposite part of that space inside the liquid ring where the suction, respectively the pressurizing occurs. Such pumps can suck gasses as well as liquids, and can generate high overpressures on the pressure side. Said liquid-ring vacuum pump 3 also pumps the condensate from the heat exchanger 2 to the venting cylinder 4 and thus insures an underpressure inside collectors 1. A return line 20 wherein a valve 21 is mounted, shunts the vacuum pump 3 and connects on the one hand to venting cylinder 4, and on the other hand to that portion lying between pump 3 and heat exchanger 2, of line 12. Said return line 20 maintains the flowing through the liquid-ring pump with a flow rate which is regulated by valve 21. This is necessary when the flow rate through line 12 is too small to insure normal operation of pump 3.

Figure 5:
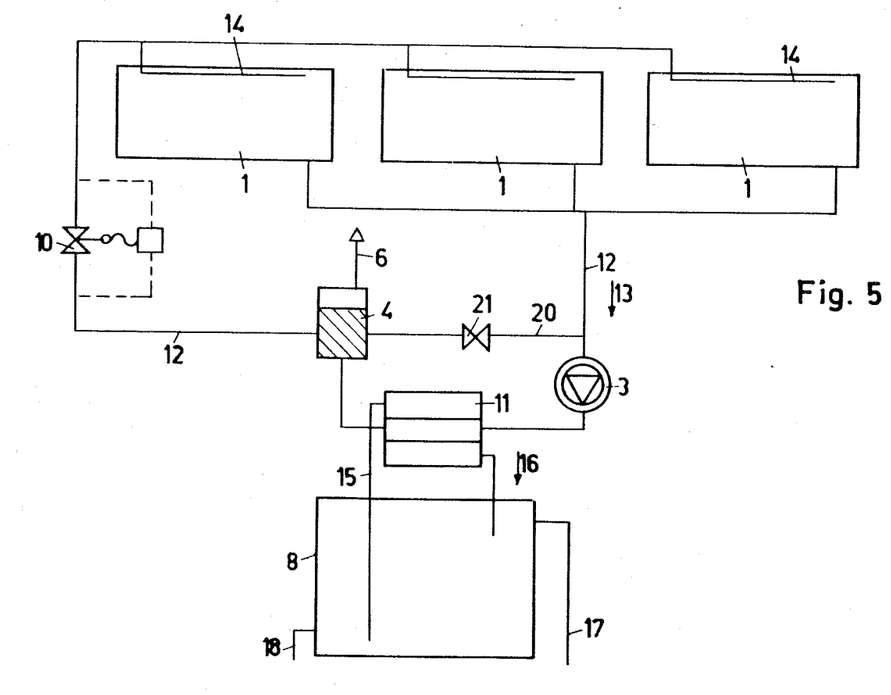
FIG. 5 is a diagrammatic showing similar to FIGS. 1 and 4, of a sun heating equipment according to the invention but pertaining to a third embodiment of such an equipment.

The embodiment of the sun heating equipment as shown in FIG. 5 differs from the embodiment as shown in FIG. 4 in the condenser-designed heat exchanger 2 being replaced by a usual water/water heat exchanger 11 which moreover does not lie upstream of the liquid-ring vacuum pump 3, but rather between said pump 3 and the venting cylinder 4, in line 12. The primary part of heat exchanger 11 lies in line 12, while the secondary part thereof is mounted in hot water line 15.

The operation of the sun heating equipment as shown in FIG. 5 is similar to the operation of the sun heating equipment as shown in FIG. 4, to that difference that the condensing of the water vapour does not occur inside the heat exchanger, but rather inside the vacuum pump 3.

Figure 6:
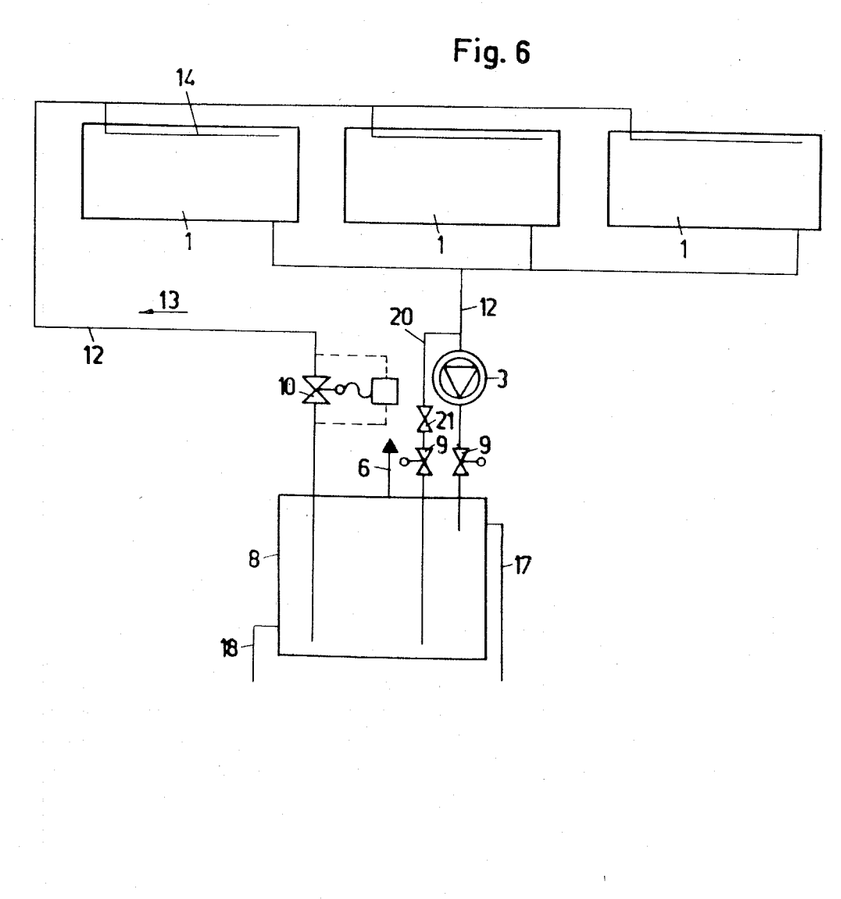
FIG. 6 is a diagrammatic showing similar to FIGS. 1,4 and 5, of a sun heating equipment according to the invention, but pertaining to a fourth embodiment of such an equipment.

In the embodiment of the sun heating equipment as shown in FIG. 6, the vacuum pump 3 is also a liquid-ring vacuum pump which fulfils the function of condenser. To the contrary of the above-described embodiments, the equipment does not comprise a discrete venting cylinder in line 12, but the function of said cylinder is fulfilled by tank 8, which tank also forms the means for removing heat from line 12. Said storage tank 8 is then also directly mounted in line 12, downstream of the liquid-ring vacuum pump 3. That portion lying upstream of storage tank 8 of said line 12 opens on the top side of said tank. To the top of said storage tank 8 connects an automatic venting device 6. The return line 20 connects directly to the bottom of storage tank 8, instead of to the venting cylinder. Electro-magnetic stop valves 9 are mounted upstream of tank 8, respectively in line 12 and return line 20. Said stop valves 9 are opened but after pump 3 has started working. The collectors 1 are identical to the collectors in the previous embodiments, and upstream of said collectors, a flow control device 10 is also mounted in line 12. The flow rate regulating cock of said device 10 is, as well as the stop valves 9, opened but after the pump 3 has started working. Heat is removed from line 12 due to hot water being discharged from storage tank 8 and thus from line 12 through discharge line 17, and replaced by cold water which is fed to tank 8 through feed line 18. The hot water from line 12 itself is being used and the heat-transfer water is not discrete from the water being used. In this embodiment, there is obtained a very slight pressure differential between collectors 1 and the means to remove heat from line 12. The temperature differential between collectors 1 and the water inside storage tank 8 is also very small. The working of the equipment is similar to the operation of the equipment as shown in FIG. 5, with the difference that the heat transfer occurs inside storage tank 8 and pressure changes inside the equipment are balanced by storage tank 8.

Figure 7:
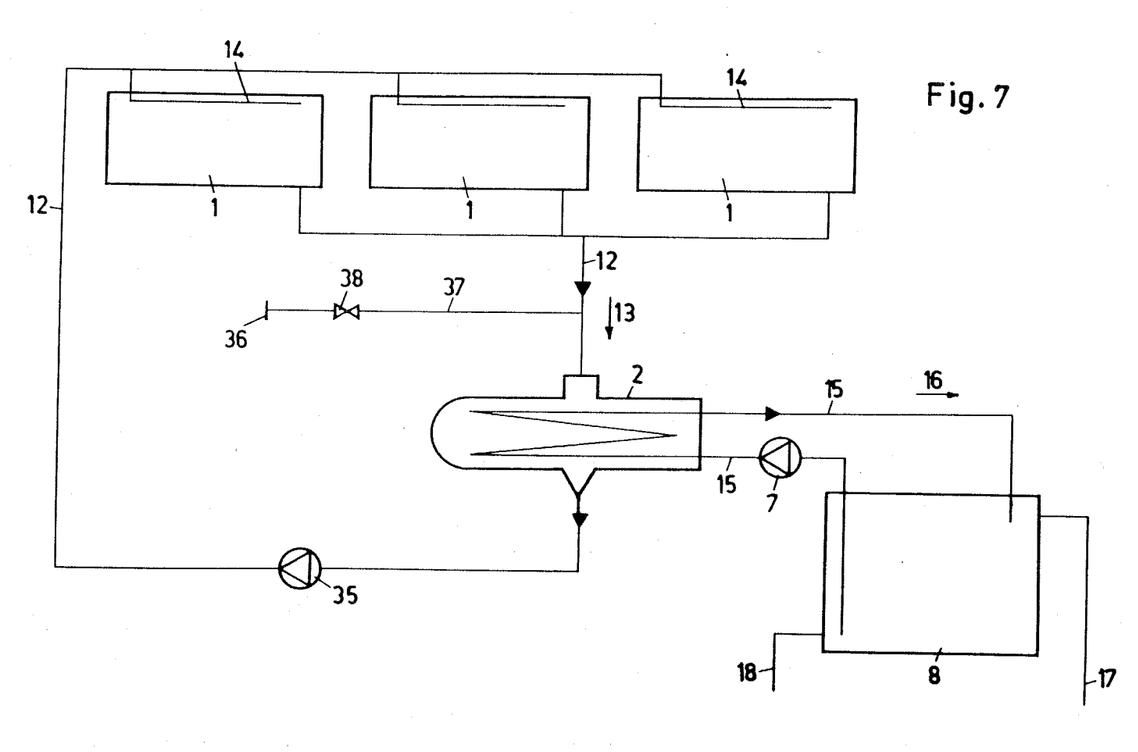
FIG. 7 is a diagrammatic showing similar to FIGS. 1 and 4 to 6, of a sun heating equipment according to the invention, but pertaining to a fifth embodiment of such an equipment.

The embodiment of the sun heating equipment as shown in FIG. 7 differs from the embodiment as shown in FIGS. 1 and 4 due to neither a vacuum pump 3, nor a venting cylinder 4, nor a flow control device 10 being mounted in line 12, but to the contrary in line 12 between heat exchanger 2 and the inlet to collectors 1, is mounted a circulating pump 35, while a vacuum pump located outside line 12 can be connected through a connector 36 to a line 37 which is connected to that portion of line 12 lying between the outlet of collectors 1 and heat exchanger 2. In line 37 is mounted a valve 38 which is closed during the normal working of the equipment. The means for causing the heat-transfer water to flow through line 12, are thus completely separated in this embodiment, from the means for obtaining an underpressure inside the collectors 1. When starting the equipment working, all of the air is pumped from the collector circuit by means of a vacuum pump, through connector 36. Thereafter through that same connector 36, the required amount of water is fed to the collector circuit and valve 38 is closed. Due to condensing inside the heat exchanger 2 operating as condenser, there prevails therein a lower pressure than inside the collectors 1, in such a way that the water vapour formed inside the collectors 1, is automatically discharged from said collectors 1.

The pump 35 may be of the usual type as well as of the positive-displacement type. A suitable pump is for example a diaphragm pump. Said pump may be used simultaneously to regulate the flow rate fed to the collectors 1.

In all of the described embodiments, but a small amount water in liquid form lies inside the collectors 1, in such a way that the heat inertia of the collectors 1 is very low. A portion of such water which corresponds to the sun exposure of the collector, is so vaporized that due to the high heat transfer, a high efficiency is obtained from the equipment.

The channels 26 inside the absorbing plates 22 are nowhere completely filled with water, in such a way that freezing of said water cannot cause damage to the absorbing plates 22.

The invention is in no way limited to the abovedescribed embodiments and within the scope of the patent application, many changes may be brought to the described embodiments, notably as regards the shape, the arrangement, the composition and the number of the components which are being used to embody the invention.

We claim:

1. A sun heating equipment comprising:
   a sun collector which comprises:
      an upwardly-directed hollow tightly-closed absorbing plate,
      inlet means for fluid into the absorbing plate at a top of this plate, and
      outlet means for fluid from the absorbing plate at a bottom of this plate,
   said absorbing plate comprising two panels which are secured with the edges thereof to one another and which have depressions extending in a first direction over part of the absorbing plate width and thus forming flow channels extending in this first direction, said flow channels connecting said inlet means with said outlet means inside said absorbing plate, the inner walls of said absorbing plate being moistenable at least in the location of the flow channels,
   a line for fluid connecting outside the absorbing plate the outlet means from the absorbing plate to the inlet means into the absorbing plate,
   heat-transfer fluid inside said line and inside said flow channels of said absorbing plate, said heat-transfer fluid vaporizing at the temperature reached within said flow channels under sun irradiation of said collector,
   a heat exchanger comprising as a primary part a condenser inside said line and a secondary part, said fluid condensing in said condenser,
   a vacuum pump directly mounted in said line between said condenser and said inlet means, said vacuum pump being of a type which can pump gaseous as well as liquid fluid,
   a venting cylinder between said vacuum pump and said inlet means,
   a distributing device which extends in a direction perpendicular to the above-mentioned first direction of the flow channels and which feeds the fluid in liquid form with a limited flow rate to said flow channels, so as to have the moistenable walls regularly irrigated at least at the top with a thin film of liquid fluid, and
   a flow control device between said venting cylinder and said outlet means which lets through a flow rate which can be vaporized in the absorbing plate with a determined sun radiation on said absorbing plate so that the fluid does not fill completely at any height whatsoever said flow channels and is vaporized at least for the most part before reaching the bottom of said absorbing plate.

2. Sun heating equipment as defined in claim 1, in which the flow control device lets through a constant flow rate which is substantially equal to that flow rate which can be vaporized in the absorbing plate with a maximum sun radiation on said absorbing plate.

3. Sun heating equipment as defined in claim 1, in which the flow control device lets through a flow rate which is substantially equal at every moment, to that flow rate which can be vaporized in the absorbing plate with the sun radiation present on that moment which falls on said absorbing plate.

4. A sun heating equipment comprising:
   a sun collector which comprises:
      an upwardly-directed hollow tightly-closed absorbing plate,
      inlet means for fluid into the absorbing plate at a top of this plate, and
      outlet means for fluid from the absorbing plate at a bottom of this plate,
   said absorbing plate comprising two panels which are secured with the edges thereof to one another and which have depressions extending in a first direction over part of the absorbing plate width and thus forming flow channels extending in this first direction, said flow channels connecting said inlet means with said outlet means inside the said absorbing plate, the inner walls of said absorbing plate being moistenable at least in the location of the flow channels,
   a line for fluid connecting outside the absorbing plate the outlet means from the absorbing plate to the inlet means into the absorbing plate,
   heat-transfer fluid inside said line and inside said flow channels of said absorbing plate, said heat-transfer fluid vaporizing at the temperature reached within said flow channels under sun irradiation of said collector,
   a heat exchanger comprising as a primary part a condenser inside said line and a secondary part, said fluid condensing in said condenser,
   a water jet pump having
      a vacuum chamber in said line between said condenser and said inlet means,
      a return line connecting an outlet of the vacuum chamber to an inlet of the vacuum chamber, and
      a circulating pump in said return line,
   a venting cylinder in said return line and connected to said inlet means,
   a distributing device which extends in a direction perpendicular to the above-mentioned first direction of the flow channels and which feeds the fluid in liquid form with a limited flow rate to said flow channels so as to have the moistenable walls regularly irrigated at least at the top with a thin film of liquid fluid, and
   a flow control device between said venting cylinder and said outlet means which lets through a flow rate which is substantially equal to that flow rate which can be vaporized in the absorbing plate with a determined sun radiation on said absorbing plate so that the fluid does not fill completely at any height whatsoever said flow channel and is vaporized at least for the most part before reaching the bottom of said absorbing plate.

* * * * *